United States Patent
Reischmann

(10) Patent No.: US 11,439,164 B2
(45) Date of Patent: *Sep. 13, 2022

(54) VIBRATING COOKING SYSTEM

(71) Applicant: Michael Reischmann, Eustis, FL (US)

(72) Inventor: Michael Reischmann, Eustis, FL (US)

(73) Assignee: Kenyon Technologies, LLC, Key Largo, FL (US)

( * ) Notice: Subject to any disclaimer, the term of this patent is extended or adjusted under 35 U.S.C. 154(b) by 192 days.

This patent is subject to a terminal disclaimer.

(21) Appl. No.: 16/130,505

(22) Filed: Sep. 13, 2018

(65) Prior Publication Data

US 2019/0008189 A1    Jan. 10, 2019

Related U.S. Application Data

(63) Continuation of application No. 14/701,203, filed on Apr. 30, 2015, now Pat. No. 10,098,370, which is a continuation of application No. 13/666,674, filed on Nov. 1, 2012, now Pat. No. 9,084,504, which is a continuation-in-part of application No. 13/589,681, (Continued)

(51) Int. Cl.
| | |
|---|---|
| H05B 6/12 | (2006.01) |
| A23L 5/10 | (2016.01) |
| A47J 37/06 | (2006.01) |
| A47J 27/00 | (2006.01) |
| H05B 1/00 | (2006.01) |
| A23L 7/161 | (2016.01) |
| A47J 36/00 | (2006.01) |
| A47J 36/02 | (2006.01) |
| A23P 20/10 | (2016.01) |

(52) U.S. Cl.
CPC ............ *A23L 5/10* (2016.08); *A23L 7/161* (2016.08); *A23P 20/10* (2016.08); *A47J 27/00* (2013.01); *A47J 27/002* (2013.01); *A47J 36/00* (2013.01); *A47J 36/02* (2013.01); *A47J 37/0629* (2013.01); *H05B 1/00* (2013.01); *H05B 6/12* (2013.01); *H05B 6/1209* (2013.01); *A23V 2002/00* (2013.01)

(58) Field of Classification Search
CPC ..... H05B 6/1209; H05B 6/12; B01F 11/0014; B01F 11/0005
USPC .......... 99/451, DIG. 14, 348, 422; 219/620, 219/622, 624, 625; 366/108, 112, 111, 366/114, 117
See application file for complete search history.

(56) References Cited

U.S. PATENT DOCUMENTS

| | | |
|---|---|---|
| 2,012,981 A | 9/1935 | Wildey |
| 2,829,528 A | 4/1958 | Hulick, Jr. |

(Continued)

FOREIGN PATENT DOCUMENTS

| | | | | |
|---|---|---|---|---|
| EP | 0499570 A1 | * | 8/1992 | ............ A47J 27/14 |
| GB | 2451672 A | | 2/2009 | |

(Continued)

*Primary Examiner* — Reginald Alexander
(74) *Attorney, Agent, or Firm* — St. Onge Steward Johnston & Reens LLC

(57) ABSTRACT

A cooking system that utilizes vibration to improve the convenience of preparing food and the quality of the finished product. The system uses a vibrating device coupled to a cooking vessel with a pad and/or isolation blocks disposed between the vibrator and the vessel. The cooking system can be adapted to prepare specific foods in specific quantities, such as popcorn in pre-packaged containers.

21 Claims, 13 Drawing Sheets

Related U.S. Application Data filed on Aug. 20, 2012, now abandoned, and a continuation-in-part of application No. 13/317,958, filed on Nov. 1, 2011, now abandoned.

(56) References Cited

U.S. PATENT DOCUMENTS

| | | | |
|---|---|---|---|
| 2,875,989 A * | 3/1959 | Toulmin, Jr. | A47J 43/042 366/114 |
| 3,052,554 A | 9/1962 | Colman | |
| 3,742,179 A | 6/1973 | Harnden, Jr. | |
| 3,745,290 A | 7/1973 | Harnden, Jr. et al. | |
| 4,061,315 A | 12/1977 | Eitzen et al. | |
| 4,522,117 A | 6/1985 | Weimer et al. | |
| 4,561,346 A | 12/1985 | Marquer | |
| 4,821,631 A | 4/1989 | Wong et al. | |
| 5,486,683 A | 1/1996 | Shimizu et al. | |
| 5,608,693 A * | 3/1997 | Richards | B01F 11/0005 366/114 |
| 5,954,984 A | 9/1999 | Ablah et al. | |
| 6,583,392 B2 | 6/2003 | Hershey et al. | |
| 6,927,366 B2 | 8/2005 | Sawhney et al. | |
| 7,253,382 B2 | 8/2007 | Raughley | |
| 7,456,376 B2 | 11/2008 | Berthault | |
| 7,997,018 B1 | 8/2011 | Harvey | |
| 8,344,296 B2 | 1/2013 | Metz et al. | |
| 8,796,598 B2 | 8/2014 | England et al. | |
| 2002/0078942 A1 | 6/2002 | Hershey et al. | |
| 2008/0295701 A1 | 12/2008 | Richter | |
| 2009/0289054 A1 | 11/2009 | Williams et al. | |
| 2010/0227038 A1 * | 9/2010 | Carroll, Jr. | B01F 11/0008 426/519 |
| 2010/0237064 A1 | 9/2010 | Liu et al. | |
| 2011/0268857 A1 | 11/2011 | Harvey | |

FOREIGN PATENT DOCUMENTS

| | | |
|---|---|---|
| JP | 4220987 A | 8/1992 |
| JP | 11253309 A | 9/1999 |
| WO | 9003121 A1 | 4/1990 |

* cited by examiner

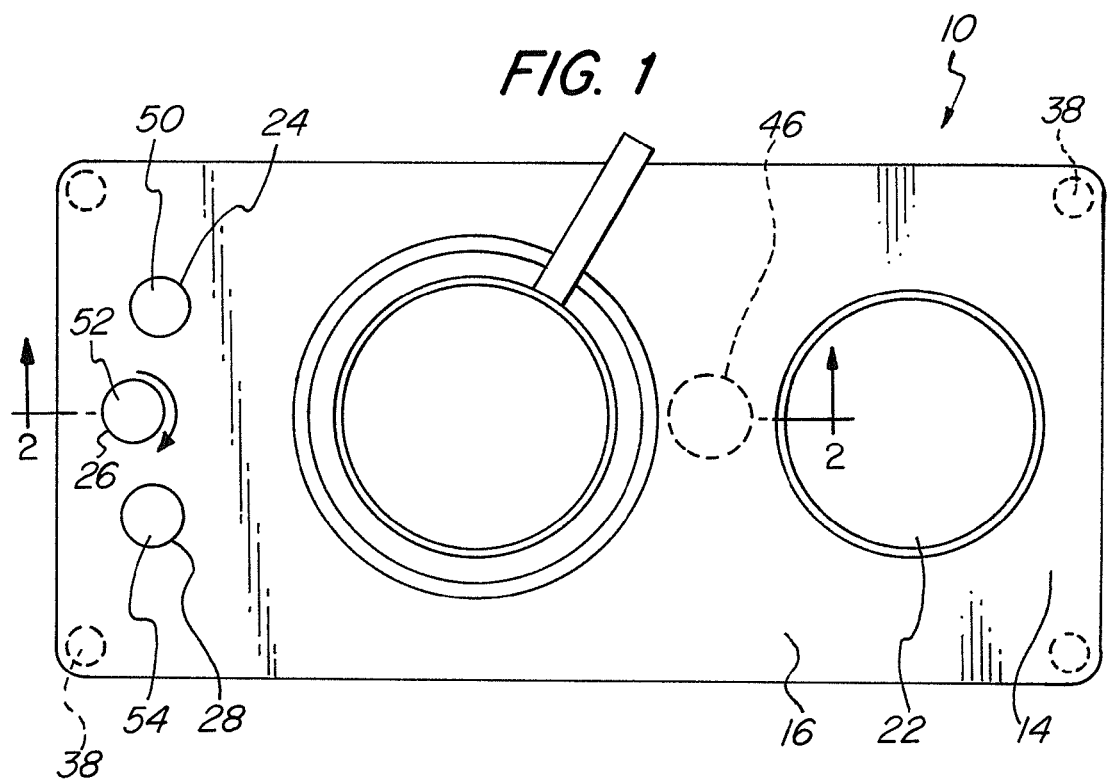
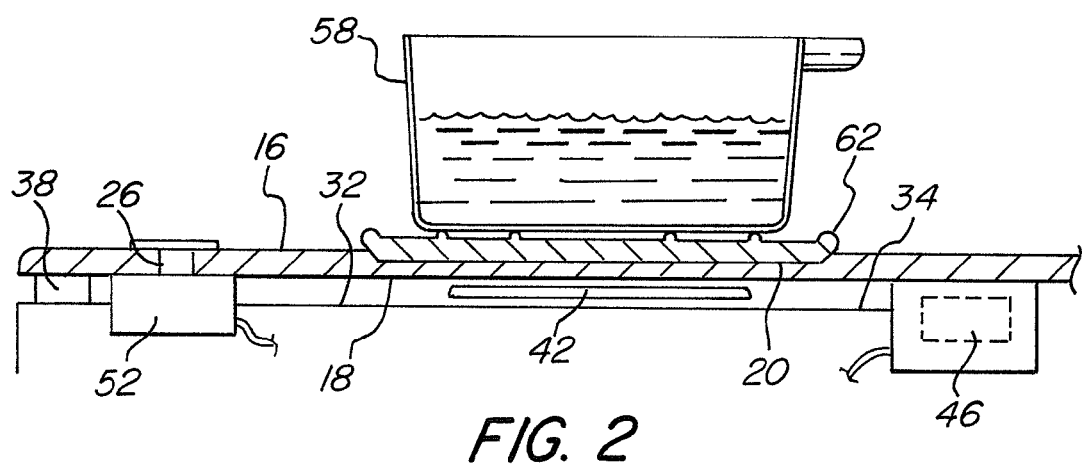

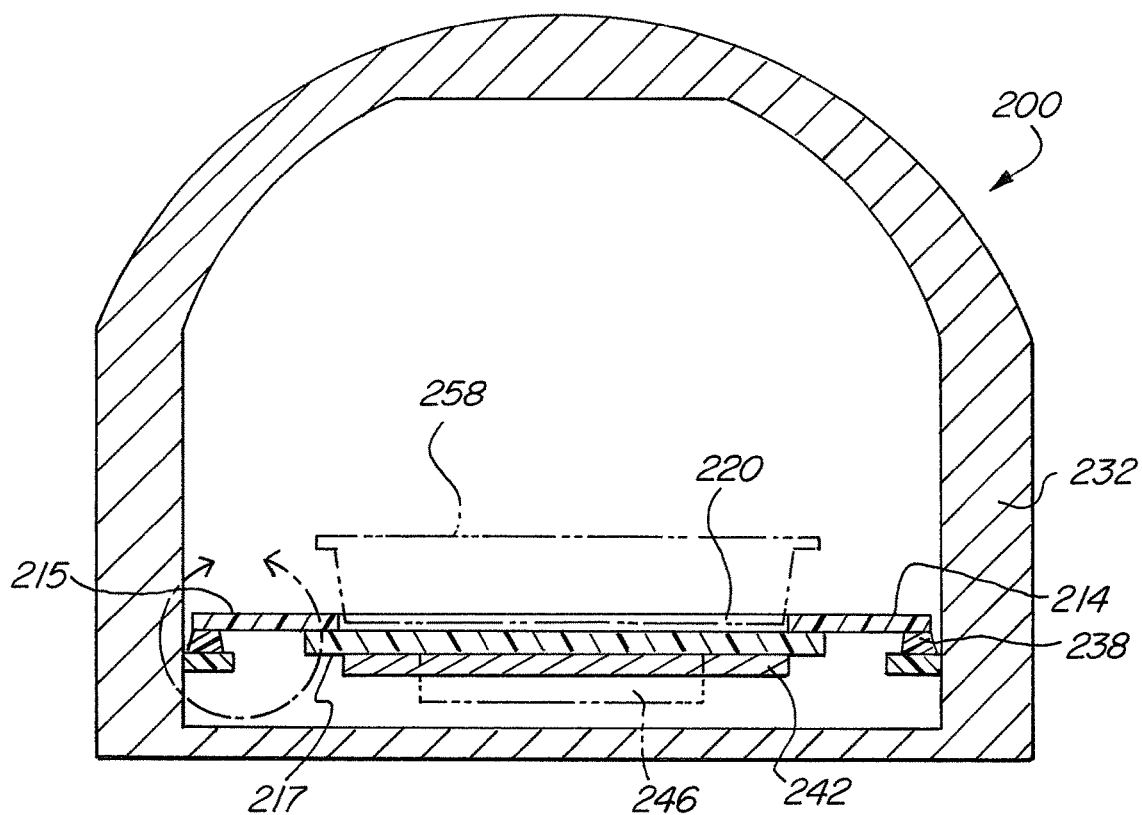
FIG. 7
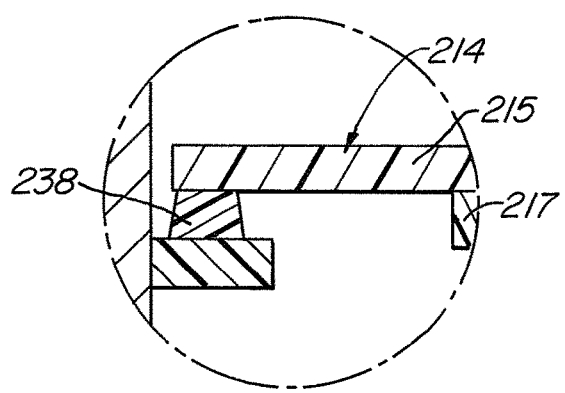
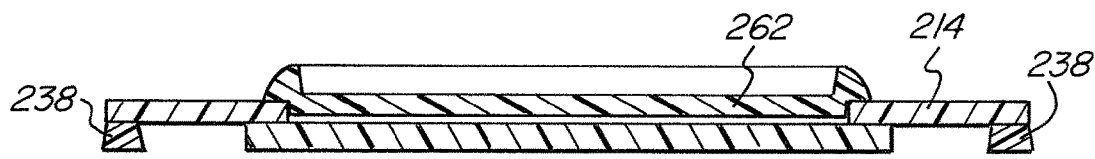
FIG. 8

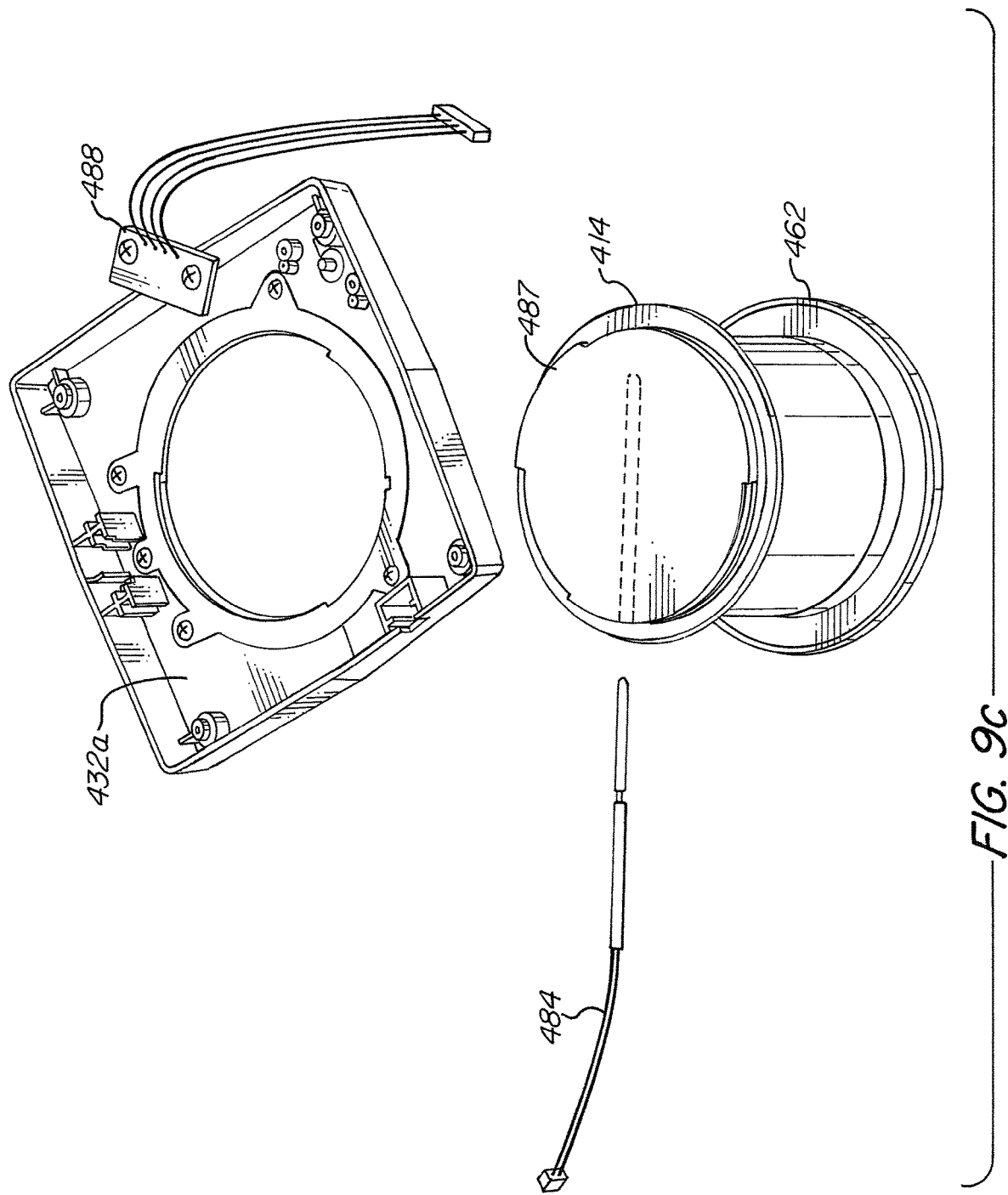

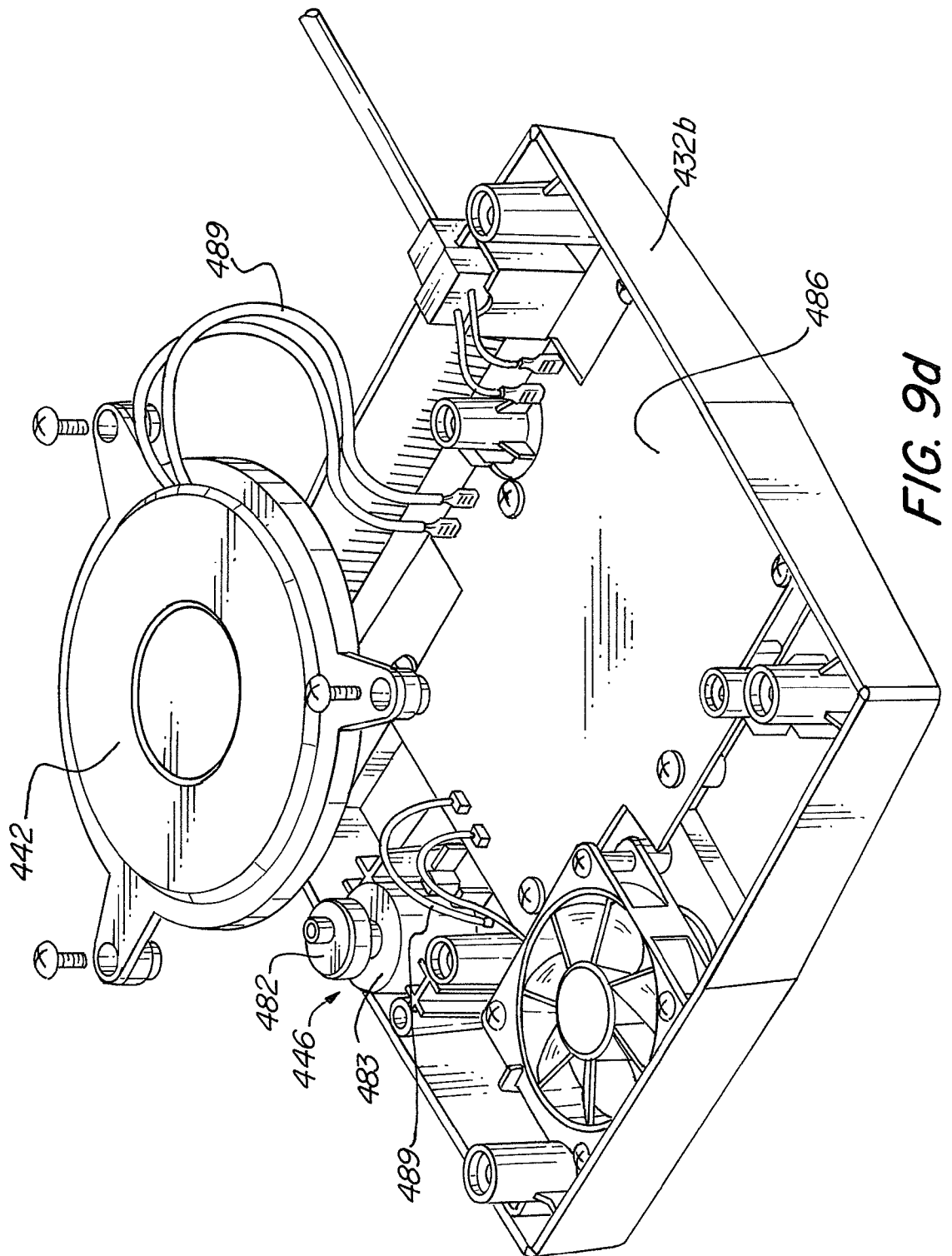

VIBRATING COOKING SYSTEM

FIELD OF THE INVENTION

The present invention relates to cooking systems that utilize a vibrating device to improve the process of food preparation. More particularly, the present invention pertains to the use of induction and vibration to cook and prepare food, including popping popcorn.

BACKGROUND OF THE INVENTION

It is well known that the quality of food is improved when it has been properly stirred or mixed during preparation. Stirring and mixing promotes even heating and cooking so that the finished product is consistently and thoroughly prepared. This is true whether the food is rice, oatmeal, meat, or popcorn. However, it is also known that the need to mix or stir food while it is being cooked is a time consuming, tiresome, and often tedious aspect of food preparation. Various attempts have been made to obviate or minimize the need for manual stirring of food while it is being cooked. These attempts include use a vibrating device to impart motion to the cooking system which causes relative movement between the system and the food being cooked as well as within the food itself. For example, Japanese Patent Application Publication No. Heisei 11-253309 describes a rice cooker that includes a vibrating part. The vibrating part imparts vibration to an inner pot that is removable from the rice cooker, and which holds the water and rice intended to be cooked. The cooker includes a heating part that may heat the inner pot by induction. As another example, U.S. Pat. No. 7,997,018 discloses an electric griddle with a vibrating device attached to it to cause the cooking surface of the griddle to vibrate.

Previous attempts to use a vibrating device to assist in food preparation have had limited success for a variety of reasons. Because of their poor implementation, such attempts—including those disclosed in Heisei 11-253309 and the '018 patent—have been of limited usefulness in modern kitchens.

What is needed is an improved cooking system that will fully utilize the effectiveness of a vibrating device for assisting in the preparation of food.

The preparation of popcorn requires particular attention. In order to prepare a sufficient quantity of popped kernels that are uniformly cooked, the even application of heat to all of the kernels is imperative. Otherwise, some kernels pop earlier than others and become burned while the later-popping kernels continue to be heated. On the other hand, uneven heating can leave numerous kernels unpopped or only partially popped.

Many previous attempts have been made to engineer an efficient way to prepare high quality popcorn. For example, the well known Jiffy Pop® brand combines popcorn kernels and oil in a disposable aluminum pan with an expandable aluminum foil top. The Jiffy Pop® unit is heated on an electric range while the consumer continuously oscillates the unit, causing the kernels to move and mix in the pan. One obvious disadvantage of this method is the nearly constant attention that the consumer must pay to the task of shaking the disposable pan across the heat source.

Another example is the use of a microwave oven to heat a paper package containing kernels and oil. This method has well-known problems, including wildly uneven heating of the kernels resulting in burned popcorn and many kernels remaining unpopped. The overall flavor of popcorn prepared in the microwave is also well-known to be below average.

Thus, there is also a need for a reliable system to make high quality popcorn without requiring all of the attention of the consumer.

SUMMARY OF THE INVENTION

In order to achieve these and other objects, a cook top system is provided, comprising: a surface adapted to support a cooking vessel, a coil for creating an oscillating magnetic field that interacts with and generates an amount of heat in the cooking vessel; a vibrator coupled to the surface for vibrating the surface; and a pad formed of a thermally insulating, elastically deformable material on the surface and underneath the cooking vessel.

In some embodiments, a recess is formed in the surface in which at least a portion of the pad is disposed such that horizontal movement of the pad relative to the surface is substantially prevented. In some embodiments, removal of the pad from the surface is not impeded. In some embodiments, a heater control is coupled to the coil for varying the amount of heat generated in the vessel and a vibrator control coupled to the vibrator for varying one or both of the vibration frequency and the vibration amplitude of the vibrator. In some embodiments, the system further includes a housing in which the surface, the coil, said vibrator, and the pad are contained.

According to a second embodiment, a cooking system is provided that includes: a structure adapted to support a cooking vessel; a heating element adapted to generate heat in the cooking vessel; a vibrator coupled to the structure for vibrating the structure; and a pad formed of an elastically deformable material positioned between the structure and the cooking vessel.

In some embodiments, the structure is a housing in which the heating element, the vibrator, and the pad are contained. In some embodiments, the system further comprises a cook top surface in the housing adapted to support the cooking vessel. In some embodiments, the system further comprises a recess formed in the pad for receiving at least a portion of the cooking vessel.

In some embodiments, the structure is a substantially planar surface. In some embodiments, the heating element is a coil for creating an oscillating magnetic field that interacts with and generates an amount of heat in the cooking vessel. In some embodiments, the system further comprises a recess formed in the surface for receiving at least a portion of the pad such that the recess substantially prevents horizontal movement of the pad relative to the surface. In some embodiments, the system further comprises that removal of said pad from said surface is not impeded. In some embodiments, the system further comprises at least one elastomeric isolation block adapted to support said structure. In some embodiments, the pad is formed of a thermally insulating material.

According to a third aspect of the invention, a cartridge in which food is cooked is provided, the cartridge comprising: an outer container having a bottom and a side wall; a lower layer of insulating material on the bottom of the outer container; an intermediate layer of ferromagnetic material above the lower layer; and a cavity for holding food above the intermediate layer.

In some embodiments, the cartridge further comprises an upper cover disposed above the cavity. In some embodiments, the cartridge further comprises that the upper cover is expandable to increase the volume of the cavity. In some embodiments, the cartridge further comprises that said upper cover is formed out of a metal foil. In some embodiments, the cartridge further comprises popcorn kernels disposed in said cavity.

The invention and its particular features and advantages will become more apparent from the following detailed description considered with reference to the accompanying drawings.

BRIEF DESCRIPTION OF THE DRAWINGS

FIG. 1 is a plan view of a cook-top.

FIG. 2 is a cross-sectional view of the cook-top shown in FIG. 1, taken along line 2-2 of FIG. 1.

FIG. 7 is a cross-sectional view of the cooking appliance shown in FIGS. 6a and 6b, taken along line 7-7 of FIG. 6b.

FIG. 8 is a cross-sectional view of a cook-top.

FIG. 9b is an exploded perspective view of the cooking appliance of FIG. 9a.

FIG. 9c is an inverted exploded perspective view of a portion of the cooking appliance of FIG. 9a.

FIG. 9d is an exploded perspective view of a portion of the appliance of FIG. 9a.

FIG. 10b is a cross-sectional view of the cartridge of FIG. 10a, taken along line 10b-10b in FIG. 10a.

FIG. 11b is a cross sectional view of the cartridge of FIG. 11a, taken along line 11b-11b in FIG. 11a.

DETAILED DESCRIPTION OF THE INVENTION

Figure 3:
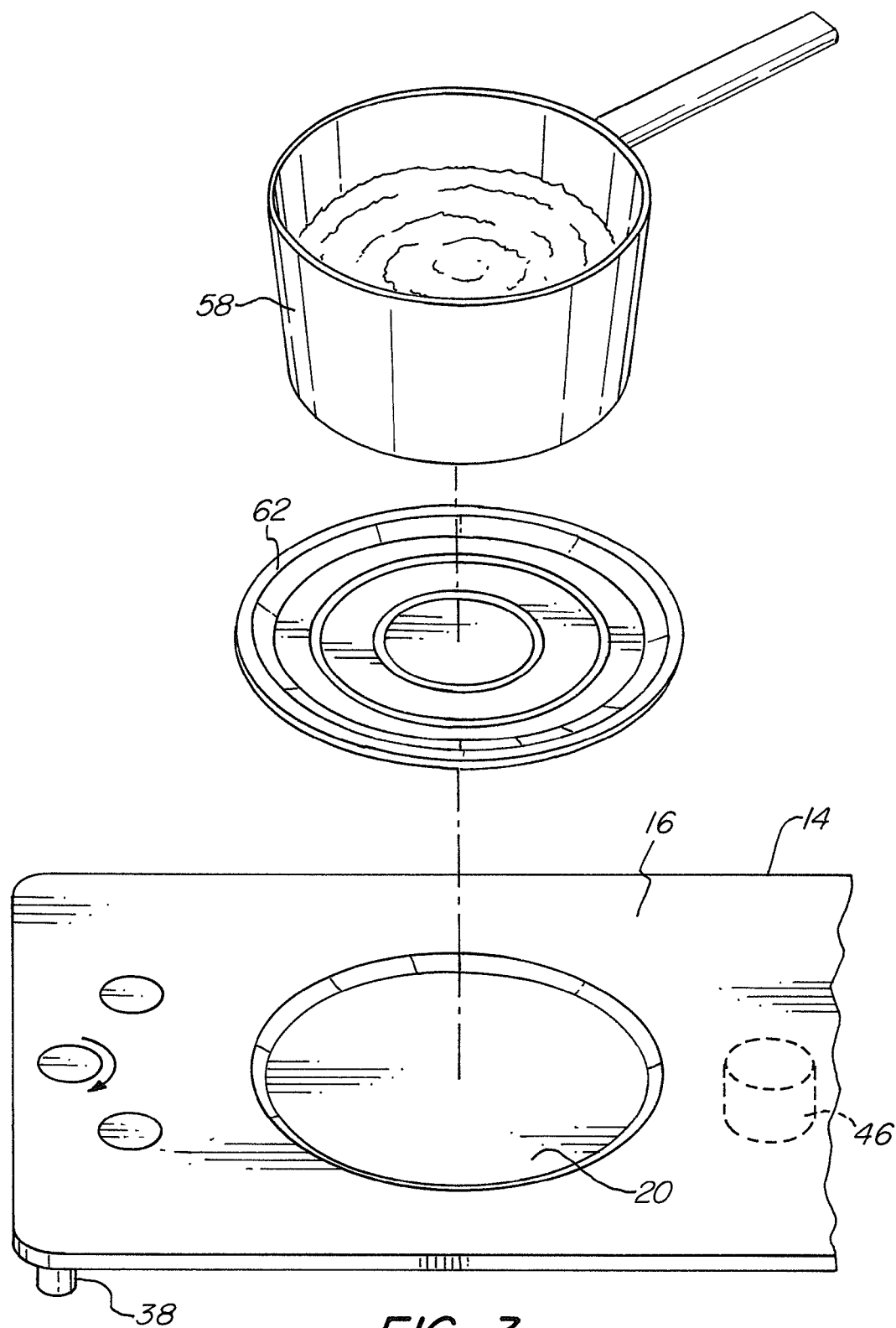
FIG. 3 is an exploded perspective view of the cook-top shown in FIG. 1.

With reference now to the drawings, embodiments of the present invention will be described. FIGS. 1, 2, and 3 show a cook-top system 10 according to one embodiment of the present invention. In a general sense, the system 10 utilizes both induction cooking technology as well as vibration to improve the efficiency of preparing food and the overall quality of the finished product.

Induction cooking systems have been known for many years but have gained popularity recently due to their many advantages over other types of cooking systems. Like a traditional electric stove, an induction stove uses electricity to generate heat. However, instead of heating a resistive element (such as a coil of metal) by passing electric current through it, an induction stove generates an oscillating magnetic field that causes the cooking vessel itself to be heated. The term "cooking vessel," as used throughout this specification, refers to any pot, pan, skillet, and/or any other suitable cooking container or hardware in which food or other material is placed to be heated on a stove.

In an induction stove, a wire coil located beneath the cook-top receives an alternating electrical current, and thereby creates an oscillating magnetic field. When a cooking vessel made from a ferromagnetic material is placed on the cook-top, the oscillating magnetic field causes the ferromagnetic material to heat up. The ferromagnetic material is heated by means of magnetic hysteresis loss in the ferromagnetic material as well as by eddy currents created in the ferromagnetic material (which generate heat due to the electrical resistance of the material). The mechanisms by which an induction stove generates heat in a cooking vessel are well known to those of skill in the art. Typically, no portion of the cook-top itself is directly heated by the induction heating element, unlike in a traditional electric stove, where a circular heating element is heated in order to heat a cooking vessel that is placed thereon.

FIGS. 1, 2, and 3 show a system 10 with a cook top 14 in the form of a generally planar rectangular plate. The cook top 14 is positioned in a horizontal orientation and has an upper surface 16 and a lower surface 18. A thickness is defined between the upper and lower surfaces. The cook top is fabricated of any material suitable for an induction stove cook-top, including ceramic, glass, high density thermoplastics, non-ferromagnetic metals (such as aluminum), etc. In some embodiments, the cook top is formed of a thermally insulating material.

The cook top 14 includes control apertures 24, 26, 28, which accommodate controls 50, 52, 54. The controls are located in a cluster at the plurality control apertures and are clustered together at a location laterally offset from the cooking area of the cook top. The controls include a first induction element control 50 and a second induction element control 52. The induction element controls 50, 52 control the potential at the induction coils 42 beneath the cooking area of the cook top. A vibrator control 54 is also provided, which controls the frequency and/or the amplitude of the vibrator.

The cook top 14 is supported by a fixedly positioned support surface 32. The support surface is located beneath the cooking plate and has an upper surface 34. In the embodiment of FIG. 1, the upper surface is in a planar configuration and is parallel with the lower surface of the cooking plate. Four isolation blocks 38 are provided that couple the cook top 14 to the support surface 32 at locations adjacent to the corners of the cooking plate. In the embodiment of FIG. 1, the isolation blocks have a thickness that is approximately the same as the distance between the cooking plate and the support surface. In other embodiments, the thickness of the isolation blocks varies from the thickness of the cooking plate by plus or minus 25 percent. In still other embodiments, the thickness is chosen based on the particular system design and the material selected for the isolation blocks. The isolation blocks are fabricated of a resilient elastomeric material. Suitable materials include plastics and rubbers, natural and synthetic, and blends thereof.

The cook top 14 has a first indentation, or recess, 20 and a second indentation 22 laterally spaced from the first. Each indentation 20, 22 corresponds to an induction cooking zone usable for heating a cooking vessel (such as vessel 58 shown in FIG. 2 and FIG. 3) on the cook top. Beneath each indentation 20, 22 is a circular induction element or coil. Shown in FIG. 2 is a first circular induction element 42, which is secured to the lower surface of the cook top 14 beneath the first indentation 20. A second circular induction element is secured to the lower surface of the cook top 14 beneath the second indentation, but is not shown in the figures. Each induction element has a coil of copper wire adapted to support an oscillating potential of appropriate volts at an appropriate frequency. As described above, the induction coils are controlled by the controls 50 and 52 by the user of the system to increase or decrease the amount of heat generated in the cooking vessel.

A vibrator 46 is secured to the lower surface of the cook top 14. In the embodiment shown in FIGS. 1 and 2, the vibrator is located between the indentations 20, 22 and the induction elements. The vibrator oscillates a mass in a horizontal plane, which imparts an oscillating, horizontal movement to the cook-top 14. The cook-top 14 is able to vibrate because of the elasticity of the isolation blocks 38. The amplitude and frequency of the vibration is chosen according to the particular design characteristics of the overall system. The vibrations can be induced by any device that will suitably transmit the vibrations to the cook top, cookware, small appliance, etc. These devices include mechanical, electrical, solid state, sonic-type devices etc. The invention will vibrate the cook top, cookware, small appliance at different frequencies and amplitudes. In most embodiments, horizontal movement of the cook top is induced, which may be in the form of purely lateral (i.e. back and forth) movement. In some embodiments, the horizontal movement is in a circular or ellipsoidal path. In still other embodiments, the vibrational movement has a vertical component. The specifics of the vibration can be tailored to the specific cooking system design.

One example of a suitable vibrating device is the combination of an electric motor having a crank attached to its driveshaft, where the crank includes an off-center mass. Rotation of the crank by the motor causes an oscillating force in the plane perpendicular to the driveshaft. This device will impart the oscillating force to whatever structure to which the motor is secured.

Next, the system includes a pad 62 made of a flexible, elastically deformable, thermally insulating material. The pad 62 is sized to fit snugly within the indentation 20, beneath the cooking vessel 58 as shown in FIG. 3. Although not shown in the figures, the system also includes a second pad that corresponds to the second indentation 22. The interaction between the pad 62 and indentation 20 substantially prevent horizontal movement of the pad 62 relative to the cook top 14. In the embodiment shown in FIGS. 1-3, removal of the pad 62 from the cook-top 14 is not impeded, so that it can be easily cleaned or replaced. The pad is adapted to facilitate the cleanliness of the system in the event of inadvertent spillage. The pad is further adapted to not adversely affect the heating and vibrating of the food in the vessel.

FIGS. 1, 2, and 3 also show a cooking vessel 58 placed on or in position to be placed on the pad 62. The vessel contains food to be cooked, which is accomplished on account of the vessel including at least some portion or element of a suitable ferromagnetic material. On account of this material, potential in the induction element is creates heat within the cooking vessel.

The coupling of the vibrator 46 to the cooking vessel 58 is enhanced by the use of the isolation blocks 38 and the pad 62. Each adds an amount of mobility to the system which increases the ability of the vibrator to impart motion to the food in the cooking vessel, while reducing or eliminating the possibility that the cooking vessel will slide relative to and away from the induction cooking zone. In some embodiments, the material of the pad is chosen so that the friction force between the pad and the cooking vessel is sufficient to prevent unwanted sliding of the vessel at all, including during vibration cooking. At the same time, the elastomeric properties of the isolation blocks 38 and/or the pad 62 permit sufficient movement of the cook-top 14, the cooking vessel 58, and, therefore, the food in the vessel.

There are various ways in which the vibrator, cook top, and induction element are arranged. In some embodiments, all three components are effectively secured together so that all move as a result of the vibrator. In other embodiments, the vibrator is secured to the cook top while the induction element is independently secured. This enables the cook top to move while the induction element remains stationary.

Figure 4:
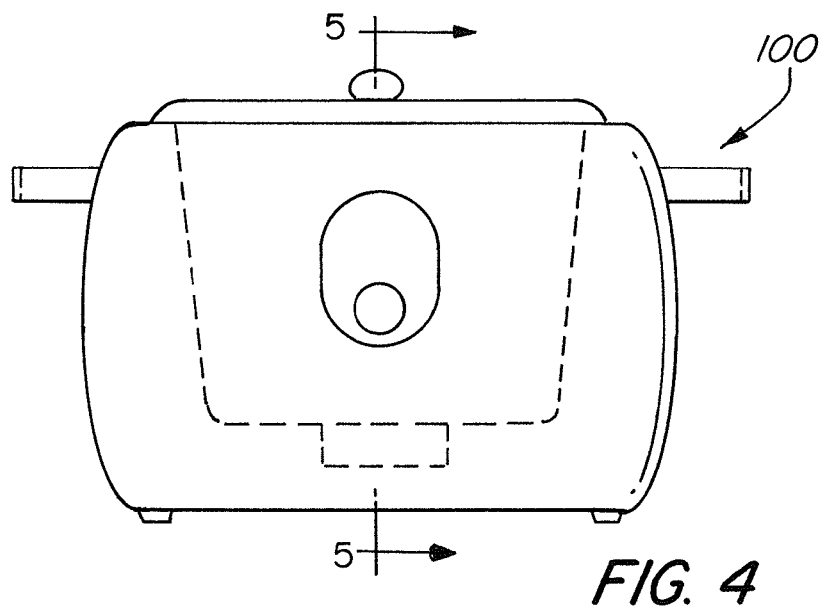
FIG. 4 is a front elevational view of a cooking appliance.
Figure 5:
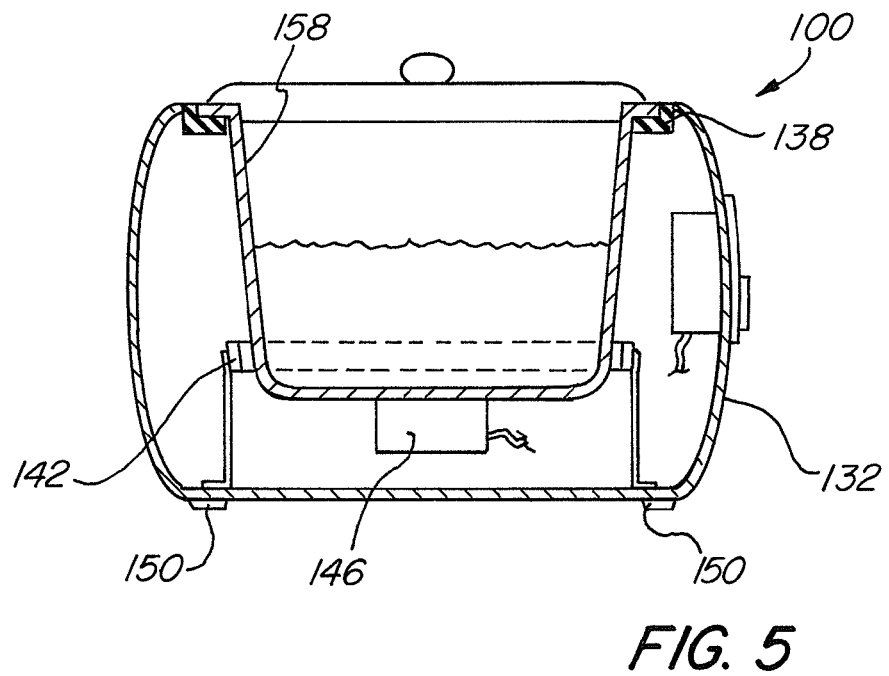
FIG. 5 is a cross-sectional view of the cooking appliance shown in FIG. 4, taken along line 5-5 of FIG. 4.

FIGS. 4 and 5 show a cooking appliance 100 according to an alternate embodiment of the invention. A cooking vessel 158 is provided for holding the food to be cooked. A casing or housing 132 is provided, in which the components of the appliance are contained. The appliance has a pad or block 138 that holds the cooking vessel 158 in the housing 132. Like the pad 62 of FIGS. 1, 2, and 3, the pad 138 is formed of an elastically-deformable, thermally insulating material. The pad 138 supports the cooking vessel in the housing around a rim of the cooking vessel.

The appliance also includes a vibrator 146, which is attached to the housing 132 but may be attached directly to the cooking vessel 146. The vibrator 146 creates an oscillating force that moves the cooking vessel to cause the food being cooked therein to also move. The appliance 100 also includes a heating element 142 for causing the cooking vessel to become warm. The heating element can be any suitable type of burner/element, including electric, radiant, induction, halogen, gas, etc.

FIG. 5 also shows feet 150 on the bottom surface of the appliance 100. The feet 150 are constructed using a resilient elastomeric material. Suitable materials include plastics and rubbers, natural and synthetic, and blends thereof. The feet 150 reduce or eliminate the possibility that the appliance will move spontaneously as a result of the vibrations. The feet 150 serve as a type of isolation block that supports the appliance.

FIGS. 6a, 6b, 7, and 8 show a second cooking appliance 200, which is specially adapted for cooking food provided in a cartridge, such as popcorn. The user simply places the cartridge in the unit 200, presses a button to begin the cooking process, and the appliance cooks the food in the cartridge, automatically shuts down, and alerts the user when it is complete. The appliance 200 includes a housing 232 with a hinged lid 233. The appliance has a cook top 214, which is made of a non-ferromagnetic material that does not heat up or otherwise interact with the magnetic field produced by an induction coil. Control buttons 252 are mounted on the housing 232 for controlling the operation of the appliance.

Figure 6A:
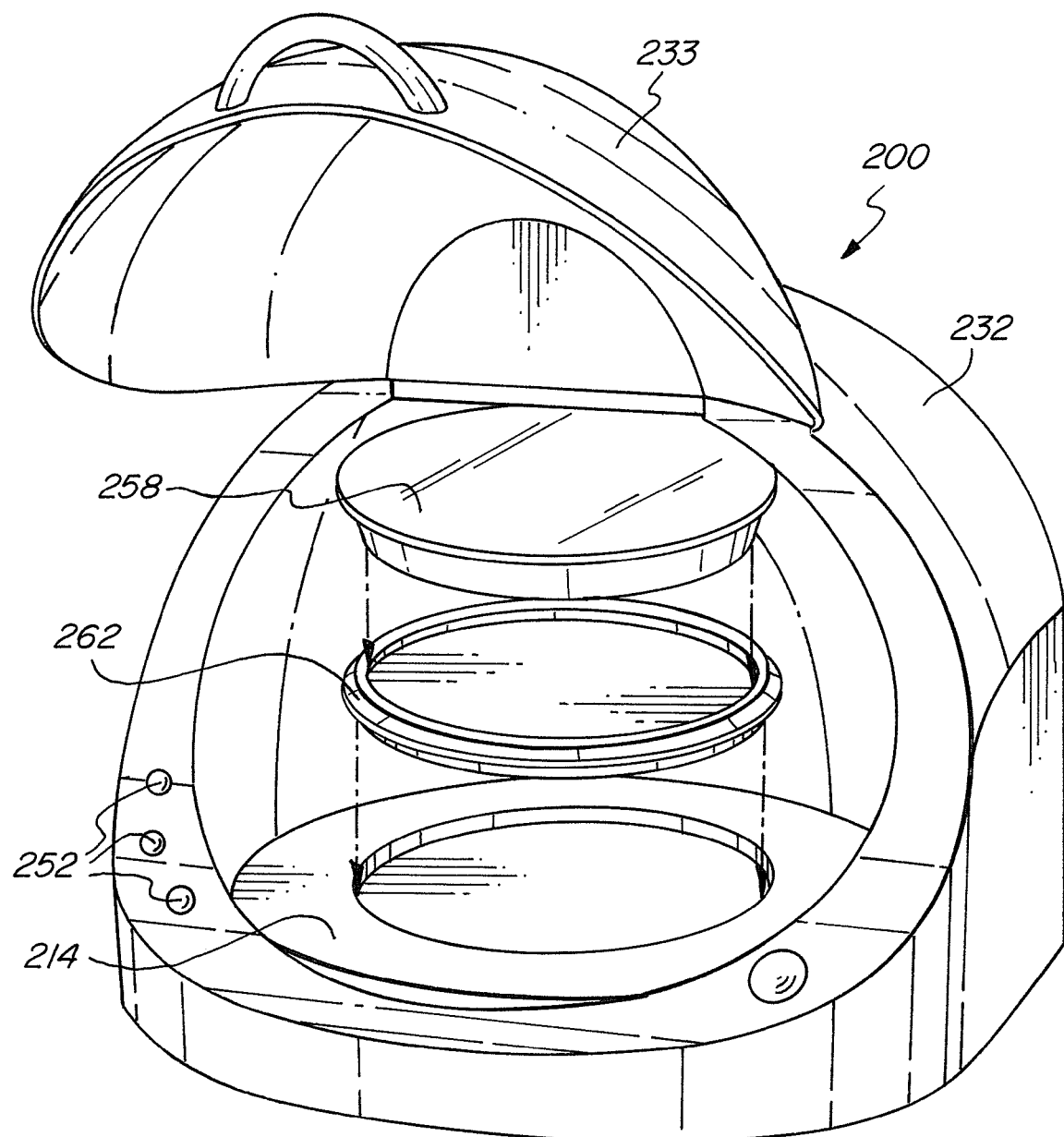
FIGS. 6a and 6b are perspective views of a second design of a cooking appliance.
Figure 6B:
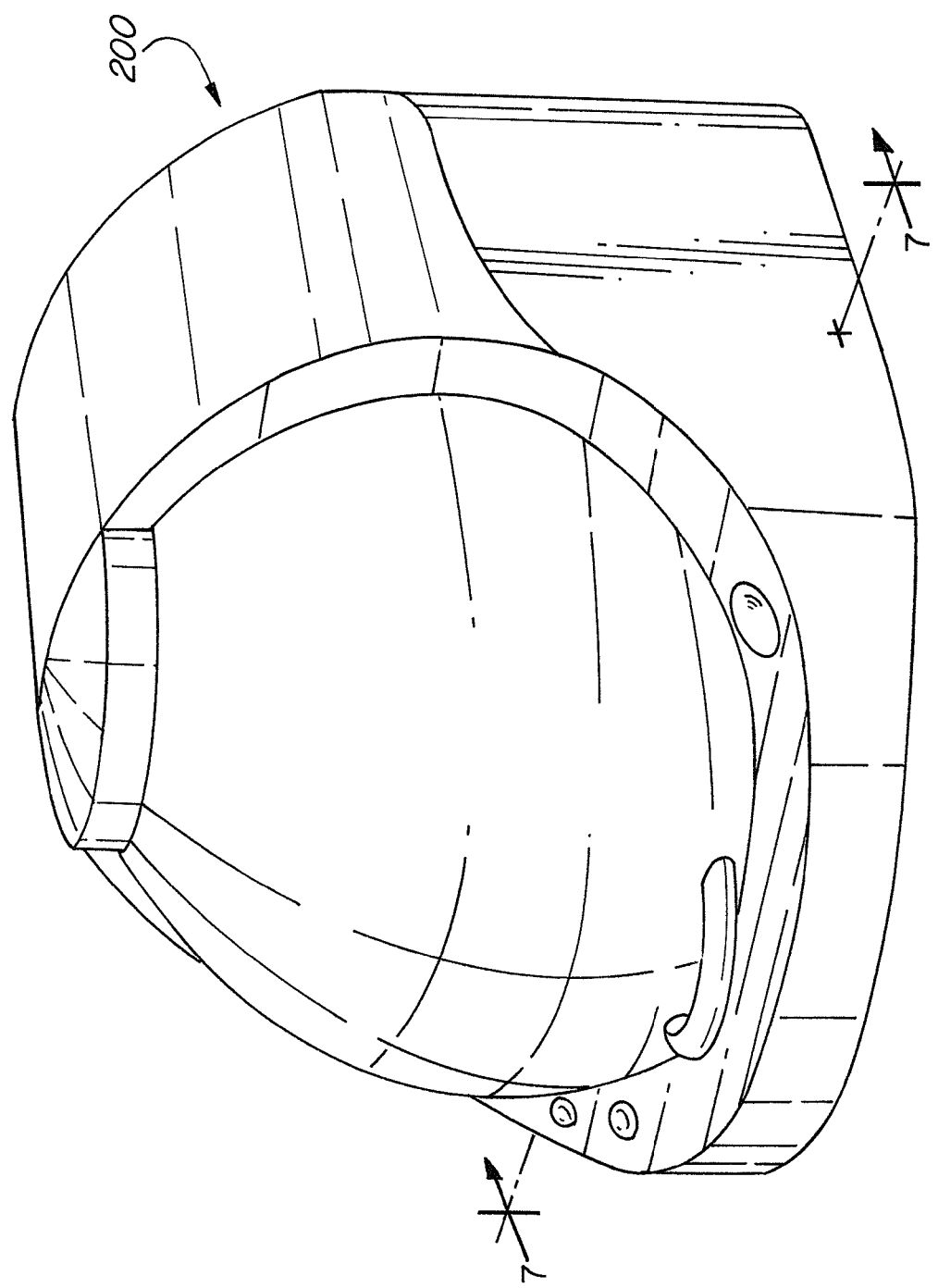

The appliance also includes a pad 262 that is adapted to be placed on the cook top 214. The cook top has a recess 220 that is shaped to hold the pad 262. The pad 262 is shaped and adapted to hold a cartridge 258. FIG. 6b shows the appliance 200 with the lid closed.

FIG. 7 is a cross sectional view of the appliance 200, which shows additional features and components of the device. The cook top 214 is comprised of two separate planar pieces: an upper portion 215 that has an opening in the center and a lower portion 217 that is slightly larger than and that covers the bottom of the opening in the upper portion 215. Using these two components to make the cook top 214 creates a recess 220. As shown in the blow-up window of FIG. 7, the cook top 214 is supported in the housing 232 by a pad or block 238, which is constructed using a resilient elastomeric material.

A vibrator 246 is attached to the cook top 214. The vibrator 246 is used to create oscillating movement in the cook top 214, which is imparted to the food in the cartridge 258. The cartridge is shown in outline in FIG. 7 resting in the recess 220 of the cook top 214. Also shown in FIG. 7 is an induction coil 242 mounted in the appliance 200 for heating the food in the cartridge 258.

The appliance 200 includes appropriate hardware and software for operating the induction coil 242 and vibrator 246 for cooking food. This can include pre-programmed software routines for powering both components for an appropriate time for specific food-cooking tasks. For example, the appliance includes a specific routine for popping popcorn that is provided in a pre-packaged cartridge. The routine will instruct the appliance to heat the popcorn cartridge for a specific duration depending on the amount and type of popcorn provided.

In some embodiments, the appliance 200 also includes a sensor and appropriate software for automatically detecting the completion of a food-cooking sequence, such as a popcorn popping operation. The sensor detects the temperature of the food, or of the cartridge, which indicates that sufficient heating has occurred to achieve the desired level of cooking. The sensor is adapted to signal the induction coil 242 and vibrator 246 to cease operation once the desired temperature has been reached. This is one way to implement the automatic popping functionality of the appliance 200. For example, a thermistor and associated circuitry can be employed as a temperature sensor.

In some embodiments, the appliance 200 also includes a sensor for automatically detecting characteristics of a food cartridge placed in the cooking zone. For example, some embodiments employ an optical sensor on the cook top for reading a bar code or other code displayed on the food cartridge. As another example, an RF sensor is embedded in the appliance for detecting an RF identification tag in a food cartridge. The code or RF identification tag on the cartridge can convey information to the device necessary for setting cooking time, cooking intensity, and vibration pattern. This feature enables a user to prepare a variety of foods automatically with the push of a single button, since the device is pre-programmed to execute numerous cooking routines.

FIG. 8 shows an alternative design for the cook top arrangement of the appliance 200. In this alternative design, the appliance includes a pad 262 that is adapted to fit in the recess 220. The pad is made of a thermally insulating, elastically deformable material so that it insulates the cook top 214 from excessive heat and ensures that the cartridge does not slide on the cook top as a result of the vibrations.

Figure 9A:
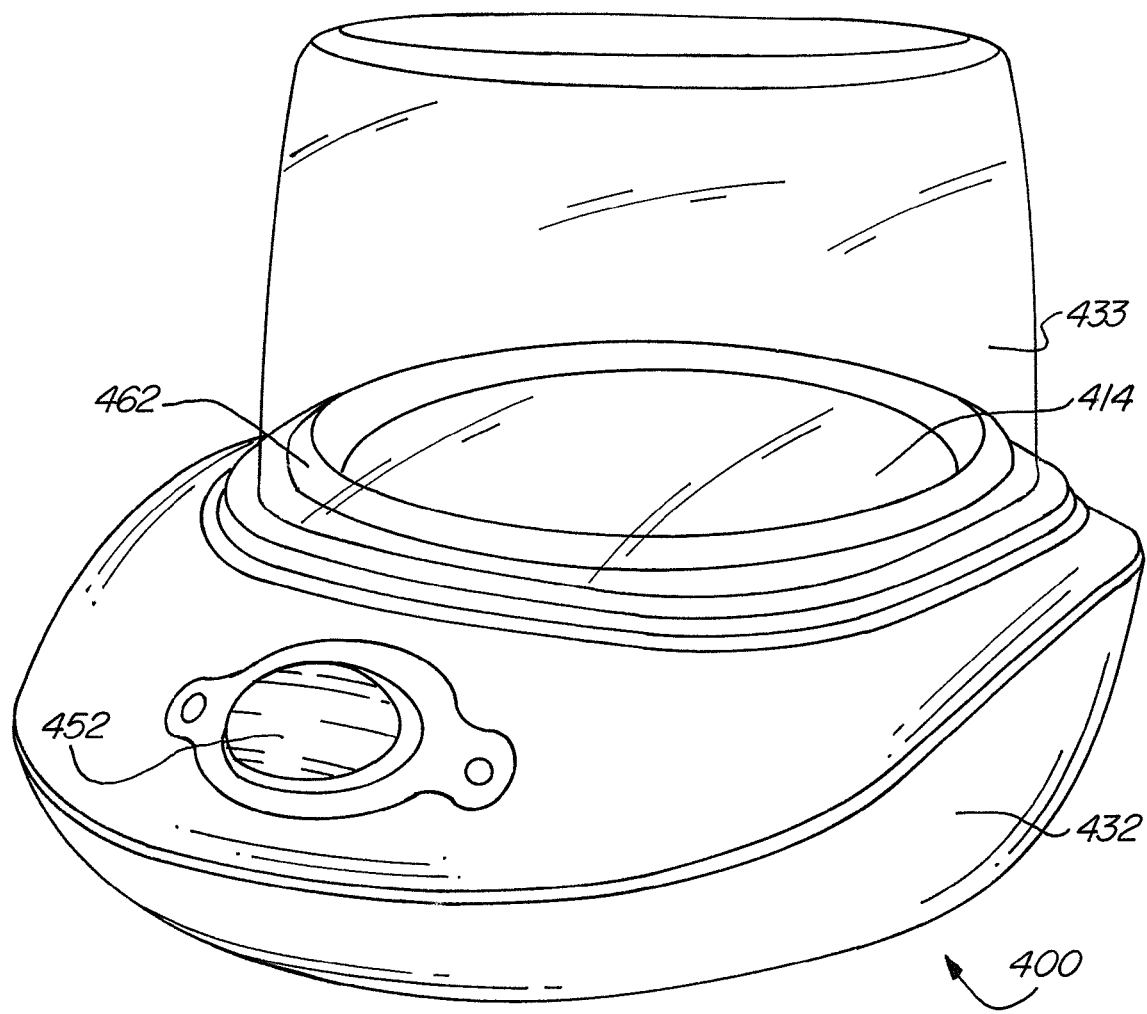
FIG. 9a is a perspective view of a third design of a cooking appliance.

FIG. 9a shows an alternative design of a cooking appliance 400 adapted to prepare food, such as popcorn, from cartridges. The appliance 400 has a differently designed housing 432, which holds the cook top 414, an induction coil, and a vibrator for moving the cook top. In this appliance design, the cook top 414 includes an integral pad 462, preferably made of a thermally insulating and elastically deformable material, such as high temperature silicone. The pad 462 also preferably has sufficient surface tack to prevent unwanted sliding of a food cartridge being vibrated on its surface.

The appliance 400 includes a fully removable lid 433 instead of a hinged lid. The lid 433 is shaped so that it can be used as a serving bowl for popped popcorn after use of the appliance 400. The lid 433 is preferably constructed from a resilient, high-temperature thermoplastic that will not flex or break easily so that it is convenient to clean and use in the kitchen.

Figure 9B:
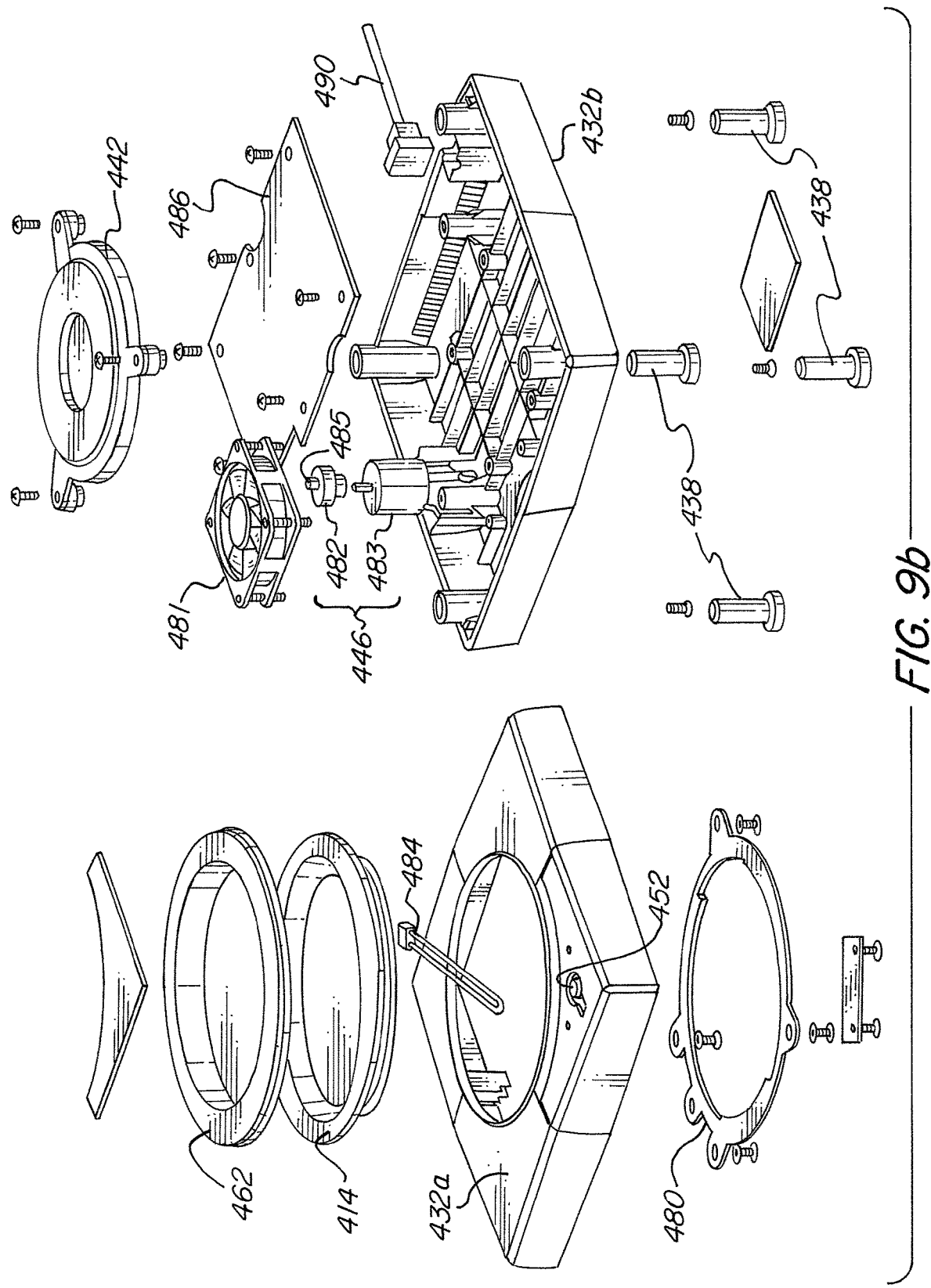

FIG. 9b shows an exploded view of the appliance 400. The housing 432 is constructed in two halves: a top half 432a and a bottom half 432b. A cook top 414 is anchored to the top half 432a of the housing using a twist-to-lock design. The pad 462 is anchored to the cook top 414 by a friction fit over the rim of the cook top, for example. The pad 462 is preferably constructed from highly-temperature resistant silicone rubber. This material helps insulate the internal components of the appliance 400 from heat generated in the cooking vessel.

A temperature sensor 484 is secured to the underside of the cook top 414. In the device shown, the sensor 484 is a thermistor, which is a device, typically comprised of ceramic or polymer, whose electrical resistance varies significantly with changes in temperature. The anchor plate 480 is bolted to the housing 432 and creates the structure to which the cook top 414 is locked using the twist-to-lock mounting feature.

The induction coil or element 442 is mounted to the bottom half 432b of the housing, and comprises a copper coil as is typical of induction elements. Also mounted to the bottom half of the housing 432b is the vibrator assembly 446. The assembly includes a motor 483. In the device shown, the motor 483 is a round, brush DC motor. A crank 482 is mounted on the drive shaft of the motor 483. The crank 482 includes an off-center mass 485 which produces an oscillating, horizontal vibrational force when the crank 482 is rotated by the motor 483. This oscillating force acts on the housing 432 and, therefore, on the cook top 414 and pad 462.

FIG. 9b shows four feet or isolation blocks 438 that are secured to the outside of the bottom half 432b of the housing. The feet 438 are constructed from an elastomeric material, such as rubber. The feet 438 dampen the transmission of the vibration of the housing 432 to the area around where the appliance is being used. The feet 438 preferably have sufficient surface tack to inhibit or prevent sliding movement of the appliance 400 as a result of the action of the vibrator assembly.

Also mounted to the bottom half 432b of the housing is a cooling fan 481, which helps maintain a stable working temperature within the housing 432. A circuit board 486 is also mounted in the housing 432, and includes the electronic circuitry necessary to control the induction element 442 and motor 483. The electrical cord 490 provides a connection to the electrical power grid.

FIG. 9c shows an inverted, exploded view of the components associated with the top half 432a of the housing. On the bottom surface of the cook top 414 a mounting fixture 487 is shown, which is used for mounting the temperature sensor 484. The small circuit board 488 is also shown, which is mounted to the top half 432a of the housing for taking inputs from the control button 452 and sending the command to the circuit board 486.

FIG. 9d shows an exploded view of the components associated with the bottom half 432b of the housing. As shown, various electrical connections 589 are made between the electrical components (e.g. induction element 442, motor 483) and the circuit board 486.

Figure 10A:
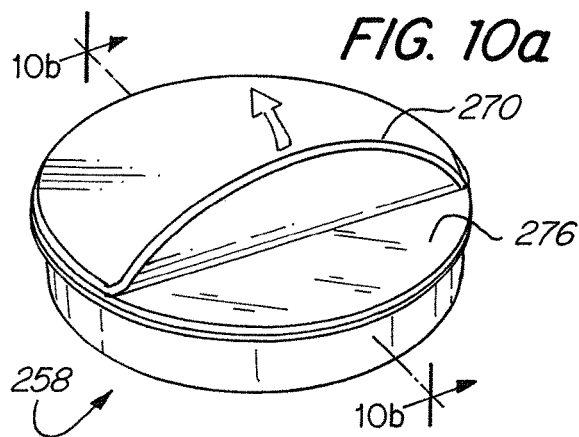
FIG. 10a is a perspective view of a cartridge.
Figure 10B:
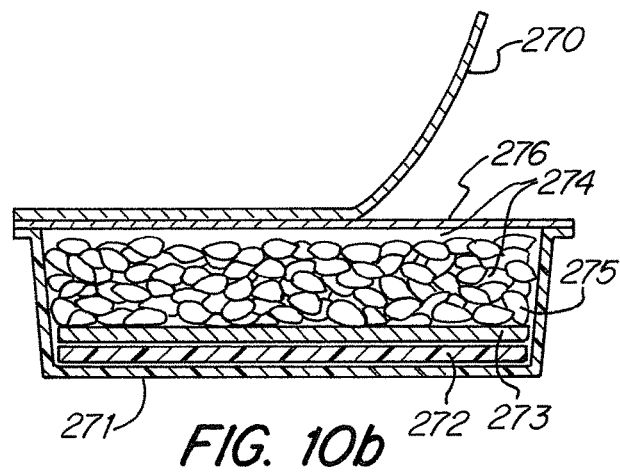

FIGS. 10a and 10b show a first embodiment of a cartridge 258 for use in a cooking appliance according to the present invention. The cartridge 258 is generally round with a paper or cardboard cover 270 that is removable from the cartridge before use. The construction of the cartridge 258 is shown in more detail in FIG. 10b. An outer container 271 holds the internal parts of the cartridge, and is made out of a suitably rugged material to withstand potentially high temperatures. These include non-ferromagnetic metals, high-temperature thermoplastics, and other suitable materials.

The cartridge 258 includes a lower layer 272 which serves a thermally insulating layer. It is made out of a material suitable for that purpose, such as high temperature silicone. Above the lower layer 272 is the intermediate layer 273 formed of a ferromagnetic material. The intermediate layer 273 interacts with the magnetic field of the induction coil and generates the cooking heat. Above the intermediate layer 273 is a cavity 274 intended to hold the food 275 to be cooked within the cartridge. Above the cavity 274 and food 275 is an upper layer 276 composed of an expandable material such as folded up aluminum foil. As an example, the cartridge 258 is advantageously used to pop popcorn. The popcorn is placed in the cavity 274 and, as it is popped due to the heat, its volume expansion is accommodated by the expandable upper layer 276.

The cartridge 258 is an example of a pre-made, disposable product that may be sold in packs or individually to consumers for use in a separately sold appliance (such as appliance 200). The food, such as popcorn, included in the cartridges can be varied to include different flavors and styles. This system vastly improves the convenience of cooking. A consumer simply has to select the desired cartridge, place it in the appliance, and press the appropriate button to operate the appliance. Once the food in the cartridge is cooked, it can be removed from the cartridge, eaten, and the cartridge discarded.

Figure 11A:
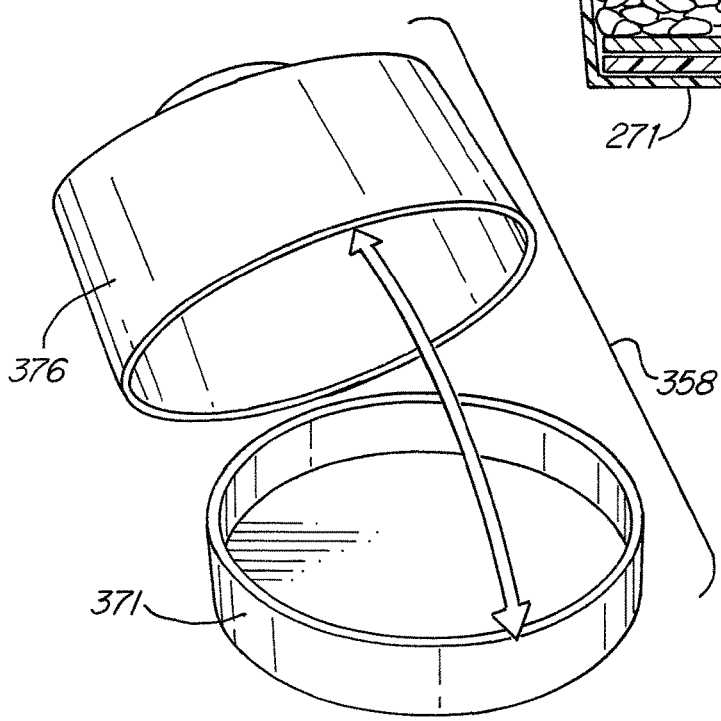
FIG. 11a is a perspective view of a second design of a cartridge.
Figure 11B:
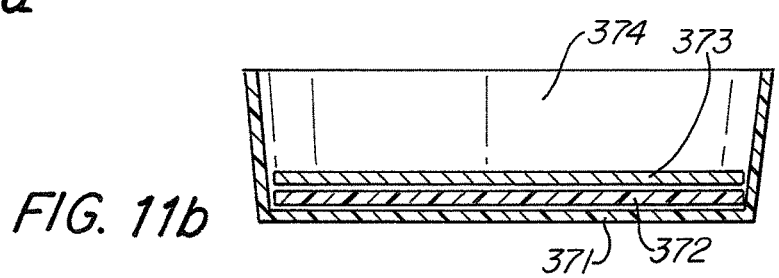

FIGS. 11a and 11b show an example of a cartridge 358, which is reusable. The cartridge 358 includes an outer container 371 and an upper lid 376. The upper lid 376 replaces the expandable upper layer 276 of the cartridge 258 shown in FIGS. 10a and 10b. The upper lid 376 is roomy enough to accommodate fully popped popcorn kernels or the expansion of other types of food as a result of cooking. The height of the side walls of the cartridge 358 vary depending on the particular application, and can be much higher than shown in FIGS. 11a and 11 b if necessary.

FIG. 11b shows a cross-sectional view of the cartridge 358. Inside the outer container 371 is a lower layer 372 of thermally insulating material such as high temperature silicone. Above that is the intermediate layer 373 of a ferromagnetic material that interacts with the magnetic field of the induction coil and generates the cooking heat. Finally, above the intermediate layer is a cavity 374 for holding food to be cooked in the cartridge, such as unpopped popcorn kernels.

Figure 13:
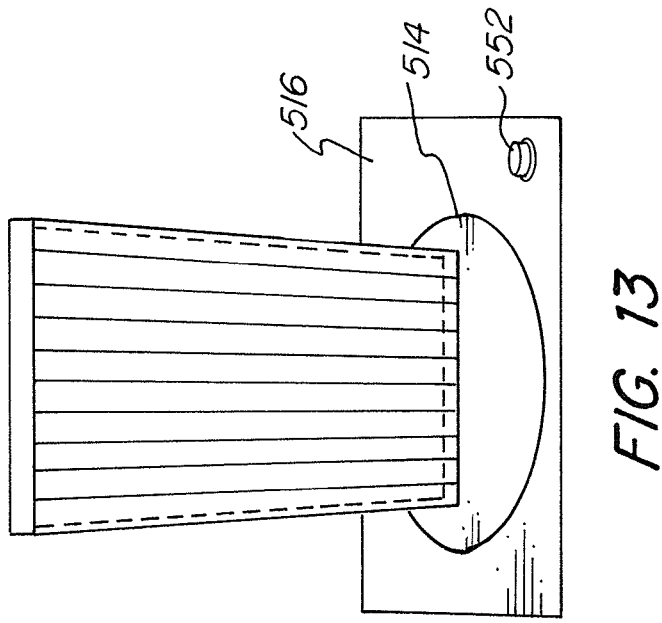
FIG. 13 is a perspective view of the induction popcorn system of FIG. 12.
Figure 12:
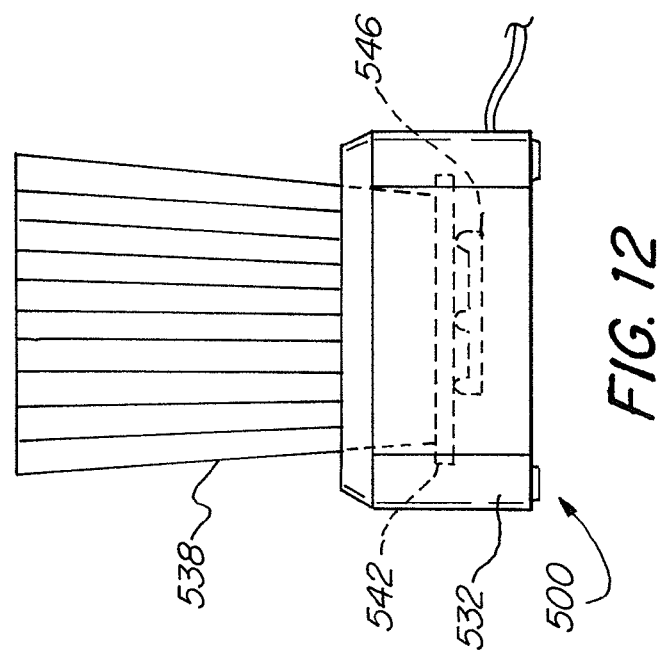
FIG. 12 is a front elevational view of an induction popcorn system.

FIGS. 12-15 show alternative designs of a cooking appliance 500 and cartridge 538. The appliance 500 is particularly suited for popcorn popping. In the front elevational view of FIG. 12, the housing 532 is shown supporting a cartridge 538. Shown schematically in the housing 532 is an induction element 542 and a vibrator 546. FIG. 13 schematically shows the cook top 514, with a generally planar upper surface 516. To pop the popcorn in the cartridge 538, the cartridge is placed on the cook top 514, the control button 552 is pressed, and the induction element 542 and vibrator 546 are energized. The system turns off automatically at the end of the cooking cycle.

The induction element is adapted to provide optimal heat for the optimal time to produce a fully cooked container of food, such as popcorn. The vibrator element is operatively coupled to the cooking surface and is adapted to support a vibration in a horizontal plane at a frequency that is optimal for the rotation and movement of popcorn kernels or other food during the cooking process. A vibrator assembly is provided which is fully automatic and produces the correct amount of frequency and amplitude needed for the cooking process.

Figure 15:
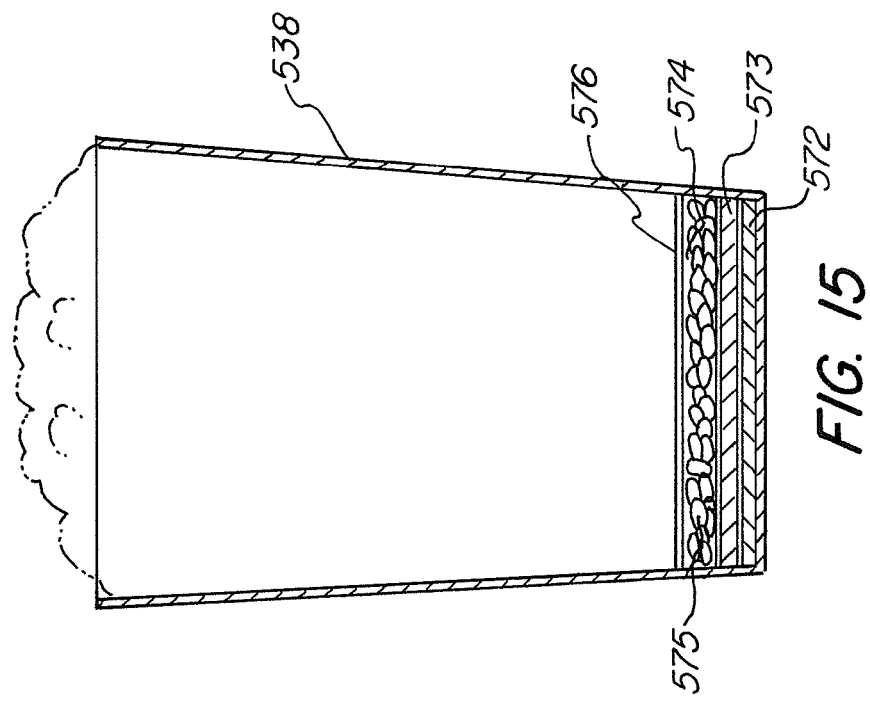
FIG. 15 is a cross-sectional view of a portion of the induction popcorn system of FIG. 12, taken along line 15-15 in FIG. 14.
Figure 14:
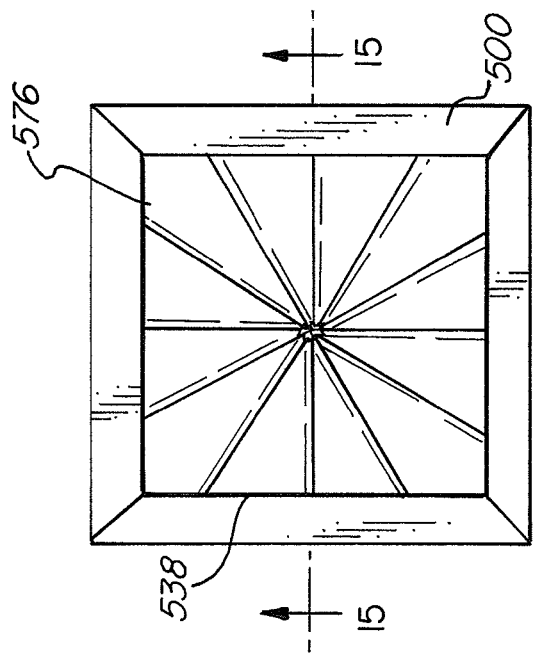
FIG. 14 is a plan view of the induction popcorn system of FIG. 12.

FIG. 15 shoes a cross sectional view of the popcorn cartridge, which is constructed in a manner similar to the cartridge shown in FIGS. 10a and 10b. The cartridge has an open top, a closed bottom, and a side wall. The cartridge also includes a lower layer 572 of material positioned upon the bottom of the container, an upper layer 576 of expandable material positioned above a cavity 574 holding popcorn 575, and an intermediate layer 573 located between the popcorn and the lower layer fabricated of a ferromagnetic material. The intermediate layer interacts with and generates heat in response to energizing of the induction element 542. The plan view of FIG. 14 shows the expandable upper layer 576. In the embodiment shown, the layer 576 is a layer of folded aluminum foil that gradually unfolds as the popcorn in the cavity 574 pops and increases in volume.

The cartridge 538 is adapted to function as a package in which the unpopped popcorn is to be sold, as a vessel for the popping of the popcorn, and also as a container for serving the popcorn to be eaten.

The present invention is designed to vibrate a stove top, cookware or small appliance, i.e. crock pot, rice cooker, popcorn maker, etc. while cooking. The stove top, cookware, small appliance, can be made of any material, i.e. glass, metal, ceramic, composite, etc.

The invention will eliminate the need for stirring in some cooking applications by keeping the contents moving. The invention will prevent food from sticking and burning in the cookware or small appliance by keeping the food moving.

It should be appreciated by those skilled in the art that various changes and modifications can be made to the illustrated embodiments without departing from the spirit of the present invention. All such modifications and changes are intended to be covered within the scope of the present invention disclosure.

What is claimed is:

1. A cooking system for heating the contents of a cooking vessel which has a cooking surface, comprising:
   a support adapted to support the cooking vessel;
   heating element comprising a coil for creating an oscillating magnetic field that interacts with and generates an amount of heat in the cooking vessel;
   a pad between said support and the cooking vessel;
   a vibrator for vibrating said cooking surface wherein said vibrator is a solid state electrical vibrator which when activated causes the cooking surface to vibrate.

2. The cooking system of claim 1 wherein the vibrator is isolated from the heating element such that isolation of the vibrator from the heating element inhibits the vibrator from vibrating the heating element.

3. The cooking system of claim 1 wherein the vibrator is isolated from the coil by at least one isolation block.

4. The cooking system of claim 1 wherein the vibrator vibrates the pad to thereby vibrate the cooking vessel.

5. A cooking system for heating the contents of a cooking vessel which has a cooking surface, comprising:
   a support adapted to support the cooking vessel;
   a heating equipment comprising a coil for creating an oscillating magnetic field which when activated interacts with and generates an amount of heat in the cooking vessel;
   a vibrator adapted to vibrate the cooking surface wherein said vibrator is separated from the heating element such that vibration of the heating element by the vibration is inhibited when the heating element and vibrator are activated;

wherein the vibrator vibrates the cooking surface activated; and a pad comprising a thermally insulating, elastically deformable material and configured to be located underneath and in contact with the cooking vessel further comprising that said vibrator is a solid state electrical vibrator.

6. The cooking system of claim 5, further comprising that the pad is formed of a thermally insulating, elastically deformable material.

7. The cooking system of claim 5, further comprising a recess formed in a surface of said support, said surface supporting the cooking vessel at least a portion of said pad is disposed in the recess such that horizontal movement of said pad relative to said surface is substantially prevented.

8. The cooking system of claim 5, further comprising that removal of said pad from said support is not impeded.

9. The cooking system of claim 5, further comprising that the pad is formed of a material adapted to create a friction force between the pad and the cooking vessel sufficient to substantially prevent sliding of the vessel relative to the support.

10. The cooking system of claim 5, wherein said pad is between the support and the cooking vessel.

11. The cooking system of claim 5, further comprising a housing in which said surface, said coil, said vibrator, and said pad are contained.

12. The cooking system of claim 11, further comprising at least one elastomeric isolation block positioned between said support and said housing; and at least one foot formed of an elastomeric isolation block for supporting the housing.

13. The cooking system of claim 5, further comprising that said vibrator imparts movement to a surface of the support in a plane of the surface, wherein the surface supports the cooking vessel.

14. A cooking system for heating the contents of a cooking vessel which has a cooking surface, comprising:

a support adapted to support the cooking vessel;

a heating element comprising a coil for creating an oscillating magnetic field which when activated interacts with and generates an amount of heat in the cooking vessel, the heating element seperated from the support;

a vibrator configured to vibrate said cooking surface wherein the vibrator is isolated from the heating element to inhibit vibration of the heating element by the vibrator when the coil is activated;

at least one elastomeric isolation block positioned between said support and the coil to inhibit vibration of the coil; and a pad configured to be located underneath the cooking vessel and between the heating element and the cooking vessel further comprising that said vibrator is a solid state electrical vibrator.

15. The cooking system of claim 14, further comprising that the pad is formed of a thermally insulating, elastically deformable material.

16. The cooking system of claim 14, wherein said pad is between said vibrator and the cooking vessel.

17. The cooking system of claim 14, further comprising that removal of said pad is not impeded.

18. The cooking system of claim 14, further comprising that the pad is formed of a material adapted to create a friction force between the pad and the cooking vessel sufficient to substantially prevent sliding of the vessel relative to a surface of the support.

19. The cooking system of claim 14, further comprising a housing in which said surface, said coil, said vibrator, and said pad are contained.

20. The cooking system of claim 19, further comprising at least one elastomeric isolation block positioned between said a surface of said support surface and said housing; and at least one foot formed of an elastomeric isolation block for supporting the housing.

21. The cooking system of claim 14, further comprising that said vibrator imparts movement to said surface in a plane of a surface of the support which supports the cooking vessel.

* * * * *